Jan. 30, 1962 G. H. FRANCK 3,018,567
RADIO STATIC GENERATOR
Filed May 5, 1958
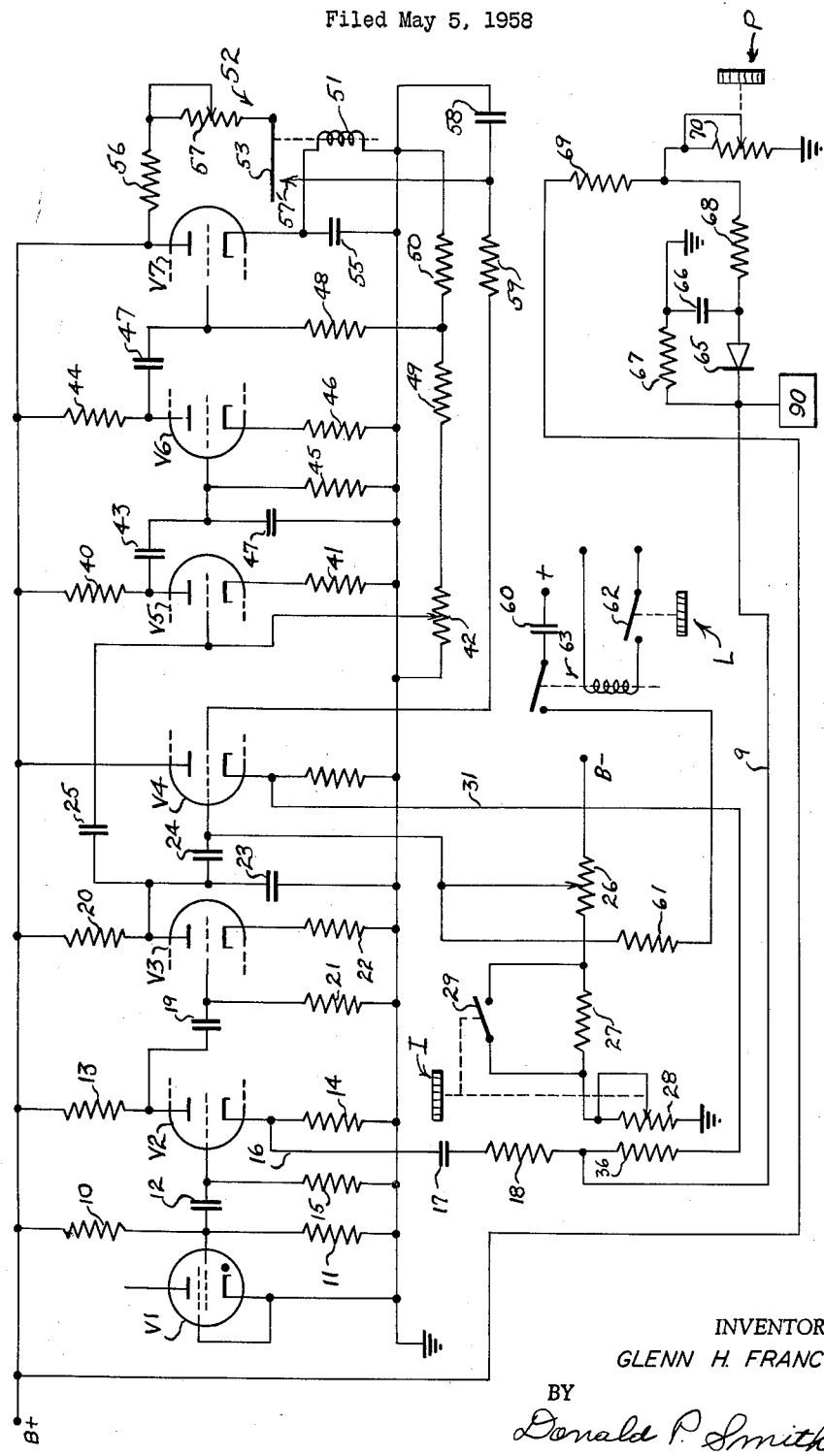
INVENTOR.
GLENN H. FRANCK
BY
Donald P. Smith
ATTORNEY

3,018,567
RADIO STATIC GENERATOR
Glenn H. Franck, District Heights, Md., assignor to ACF Industries, Incorporated, New York, N.Y., a corporation of New Jersey
Filed May 5, 1958, Ser. No. 733,181
9 Claims. (Cl. 35—12)

This invention relates generally to flight simulators of the type having an aircraft radio receiver, and more specifically to the aural representation of the receiver noises normally heard during flight.

The invention comprises an electronic circuit for developing in a student pilot's receiver a composite sound reproducing the noises generated internally by a radio receiver plus the atmospheric sounds such as static and lightning discharge bursts. These sounds appear as voltages in the disclosed circuit and are added together and fed into a speaker or earphones in the simulated aircraft cockpit to be heard by the student. A plurality of controls are available to the instructor to simulate conditions of remote static and proximate lightning and at least one control is provided for the trainee so that he can vary the noise output of the simulated receiver to a suitable or comfortable level.

This invention provides, in a relatively simple structure, a radio noise simulator having a noise output and intermittent static bursts which are very realistic since they occur at random and overlapping intervals. The invention preferably finds its setting in the type of trainer which has illumination exterior to the training cockpit to simulate lightning flashes, such flashing being synchronized in the herein disclosed circuit to provide a sharp intense burst of noise. Thus a sophisticated radio receiver simulator is provided to add to the realism of environment of simulated flight.

It is accordingly a broad object of this invention to provide a circuit for simulating the noises heard from a radio receiver by a pilot.

It is a further object of this invention to provide a circuit to synchronize simulated lightning flashes with a sharp burst of sound intensity from the radio receiver.

It is a further and more distinct object of this invention to provide a radio receiver simulator circuit which provides the trainee with the usual internally generated noises combined with random precipitation static noise and the intense atmospheric burst accompanying lightning discharges.

The invention embodies other novel features, details of construction and arrangement of parts which are hereinafter set forth in the specification and claims and illustrated in the accompanying drawing which is hereby made a part of the specification, wherein the single figure is a detailed schematic representation of the radio noise simulator.

The prime consideration in simulating the operation of an aircraft radio receiver is realism. During the actual flight of an aircraft, the pilot hears a noise from his receiver which is the composite of a hissing sound which is internally generated receiver noise, and static cracking (precipitation static) which accompanies rain, snow and even sand storms and appears to be caused by oscillating corona discharge from points on the aircraft to the surrounding atmosphere. Its intensity may be large. Static also originates in lightning discharges. The impulses are frequent and overlap so that the noise is more or less random with sharp peaks exceeding the average level. As is known, atmospheric static originates both in local storms and in more distant probable storm centers and is propagated in the same manner as other radio waves. The herein disclosed circuit very realistically simulates the above sounds.

Referring now to the drawing and considering the discharge devices there disclosed from left to right, V1 is a noise generator, V2, V3 and V4 are noise amplifiers, V4 being the output device; and V5, V6 and V7 comprise a secondary bias control amplifier. Three external controls are available. I designates a volume control available to the instructor to vary the intensity of the static, L designates a control to simulate lightning discharge bursts, and P indicates a control available to the student wherein he may vary the intensity of the composite sound heard by him.

Considering the circuit in more detail, random noise is initially generated in discharge device V1 by applying a voltage through resistor 10 to its control grid and connecting the cathode to ground. The device is a type 2D21 gas discharge tube and it is a known characteristic of this tube that a voltage applied between its grid and cathode causes random conduction through the gas, it being understood that resistor 11 together with resistor 10 provides a dividing circuit for proper voltage division. A coupling condenser 12 connects between the control grid of V1 and the control grid of V2, which has the usual plate resistor 13, biasing resistor 14, and grid resistor 15 connected thereto. An output is taken from the cathode of V2 by connection 16 through condenser 17 and resistor 18 connected through conductor 9 to the receiver. This output is the amplified random voltage output of noise generator V1 which appears on an oscilloscope as random audio frequencies and sounds to a listener as a hissing noise.

Condenser 19 couples the amplified output from the plate of V2 to the grid of V3 which has plate resistor 20, a grid resistor 21 and a cathode biasing resistor 22. Here the noise voltage is again amplified and the output thereof is filtered by condenser 23 which attenuates the high frequencies from the noise. Condensers 24 and 25 respectively couple the filtered outputs to different stages, the first of which will now be described.

V4 is the circuit output tube, its grid bias being obtained from a B minus voltage source through voltage dividing resistors 26, 27 and 28. Resistor 26 is variable and resistor 27 has a switch 29 connected to knob I to optionally short circuit the same, and resistor 28 is variable and has its slide connected to knob I, available to the instructor. It will here be seen that the bias on the grid of V4 is adjustable to vary the intensity of the output of V4 to simulate to the student the approach of static disturbances during simulated flight. Switch 29, when in the open position, increases the negative bias on the grid of V4 to a point which will keep the tube in the cut-off region. When the switch is closed, the bias is decreased to a point which allows a small amount of simulated atmospheric static to pass through the output tube. The initial bias is set on variable resistor 26 so that only the peaks of the amplified random noise voltage appear at the output (cathode) of V4 when variable resistor 28 is adjusted for minimum intensity with switch 29 closed. Bias is further decreased in a continuous manner by moving the slide on resistor 28 in a direction to decrease the total resistance. The static output of V4 is taken from the cathode through conductor 31 and resistor 36 where it is added upon the output of V2 appearing at resistor 18 and is transmitted by conductor 9 to the receiver. As will later be explained, the bias on V4 is modified through the secondary bias control amplifier to give an intermittent static burst.

As previously described, condenser 23 attenuates the higher frequencies from the output of discharge device V3 and condenser 25 couples the remaining signals to the input grid of discharge device V5 which has the usual plate resistor 40, cathode resistor 41 and bias control resistor 42. The bias is adjusted in resistor 42 so that only the highest amplitude peaks are amplified by this amplifier. The negative voltage connection to resistor 42 is not shown. The output from the plate of device V5 is coupled through condenser 43 to the input grid of discharge device V6 which has plate resistor 44, grid resistor 45 and cathode resistor 46. Here again, condenser 47 bypasses almost all of the remaining higher frequency pulses to ground and the remaining pulses are impressed on the grid of discharge device V6 where they are further amplified. The amplified positive going pulses are coupled through condenser 47 to the grid of V7 which is a relay control amplifier. Relay control amplifier discharge device V7 has grid resistor 48 connected to voltage dividing resistors 49 and 50 which apply a fixed negative grid bias to V7 thus limiting the current flow through the tube. The random positive going pulses applied to the grid of V7 raises the grid voltage level to permit some current flow through the tube and together with condenser 55 which integrates the pulses, causes enough current to flow in coil 51 of relay 52 to close armature 53 at random intervals. Resistors 56 and 57 couple the armature of relay 52 to the source of B+ and when the armature engages contact 57' the positive potential charges condenser 58 and also applies a large positive potential to the grid of output tube V4 through resistor 59. This positive voltage on the grid of V4 greatly increases the intensity of the noise output for as long as relay 52 is closed plus the discharge time of condenser 58 through resistors 59, 26 and 28. This action creates a burst effect of high intensity static at random intervals thus adding to the realism of the simulated radio receiver precipitation static and distant lightning static.

The simulation of lightning discharge accompanying lightning flashes in the intermediate vicinity of the aircraft is done by applying a positive potential through to condenser 60 and resistor 61 to the grid of output tube V4. When the instructor closes switch 62 by operating knob L, the coil of relay 63 is energized and the armature moves to the downward position. Condenser 60 which remains uncharged while the armature is open immediately starts to charge up and during the charging period a positive pulse passes through resistor 61 and then back to ground raising the level of the grid bias on V4. The result is an intense burst of noise for the duration of the charging time of condenser 60. It will be understood that lights are provided which are arranged to flash on and off simultaneously with the closing of relay 63 to thus give the trainee the effect of a lightning flash accompanied by a crash of static in his radio receiver.

As previously mentioned, the output of the circuit is the sum of the signals just described and grouped together as static together with normal receiver generated noise. These two outputs appear across resistors 36 and 18 respectively and a limiting circuit is connected by conductor 9 to the mid-point of these resistors, such limiting circuit consisting of a diode 65, a condenser 66, and resistors 67, 68, 69 and 70. Resistor 70 is variable as there shown and is controllable by a knob available to the student pilot as a receiver noise control designated as P. Diode 65 acts by its inherent biasing characteristics as a clipper in accordance with the position of variable resistor 70. The diode keeps the amplitude available for transmission to the radio receiver 90 to a predetermined level as determined by the student.

The operation of this circuit is as follows. Random voltages, generated in discharge devices V1 appear at the cathode of V2 and are transmitted to the simulated receiver as a hissing noise simulating internal receiver noise. V2 and V3 amplify the high frequency noise and transmit it to V4 after the filtering action of condenser 23 removes the high frequency components. These random amplified pulses appear at the grid of V4 and appear at resistor 36 as intermittent crackling which is typical of precipitation static. From the circuitry to this point the pilot hears the hissing of the internally generated noise and a random crackling. The amplified pulses are transmitted through condenser 25 to the bias amplifiers V5, V6 and V7 where further filtering is accomplished by condenser 47 and the remaining pulses, few in number, are amplified and finally serve to operate relay 52 which applies a strong positive pulse to the grid of output tube V4 which in turn greatly amplifies the input from condenser 24 and a burst of noise is heard at the output of the receiver simulator. The simulated lightning is performed by the instructor closing switch 62 which applies a positive pulse through resistor 61 to the grid of output device V4. The amplification of tube V4 is now increased and the sound level is greatly magnified. The pilot may vary the intensity of any of this noise at the receiver by adjustment of resistor 70.

Having described a preferred embodiment of the present invention it is to be understood that although specific terms and examples are employed, they are used in a generic and dsecriptive sense and not for purposes of limitation; the scope of the invention being set forth in the following claims.

What is claimed is:

1. In a grounded aircraft trainer a circuit to derive voltages representing the extraneous radio noises heard by a pilot during flight comprising means to generate low level random voltages representing internally generated radio receiver noise, means to filter and amplify the random voltages to derive voltages representing static, means for automatically randomly increasing the output of said last recited means to derive voltages representing high level static bursts, and means for increasing the output of said amplifying means to derive a voltage representing a lightning discharge burst.

2. The invention as set forth in claim 1 including means under the control of a trainee to limit the amplitude of the derived voltages.

3. In a grounded aircraft trainer of the type having a simulated communication radio receiver, a system to provide an aural representation of the receiver noises normally heard during flight comprising in combination means including an electron discharge device for generating random low level voltages, a first circuit connected to said device and said receiver to transmit the voltages to the simulated receiver to represent internally generated receiver noise, an output circuit including an amplifier connected to said discharge device and to the said first circuit and having biasing means for said amplifier under the control of an instructor, and a bias control circuit means connected to the said output circuit for automatically momentarily and intermittently changing the amplifier bias to thereby increase the voltage output to a high level to simulate a burst of static.

4. In a grounded aircraft trainer of the type having a simulated communication radio receiver, a system to provide an aural representation of the receiver noises normally heard during flight comprising in combination means including a discharge device for generating random low level voltages, a first circuit connecting said device and said receiver to transmit the voltage to the simulated receiver to represent internally generated receiver noise, an amplifier circuit connected to said device and including an output stage connected to said first circuit and having adjustable biasing means under the control of an instructor, a bias control means connected to the said output stage to momentarily change the output stage bias to thereby increase the voltage output to the simulaed receiver to simulate static, and circuit means under the control of an instructor to apply a biasing voltage pulse to the output circuit to thereby increase the voltage output to a high level to simulate a lightning discharge static burst.

5. The invention as set forth in claim 4 including a simulated noise limiter comprising a biasing circuit connected to the junction between the output stage and the said first circuit and comprising a diode and a potentiometer connected in parallel to a point of zero potential, the said potentiometer being under the control of a trainee and adjustable to limit the voltage input to the simulated receiver.

6. The invention as set forth in claim 4 wherein the said bias control means comprises a device to integrate voltage pulses and a relay responsive to a predetermined voltage magnitude to connect a source of voltage to the control grid of the said output stage.

7. In a grounded aircraft trainer of the type having a simulated communication radio receiver, a system to provide an aural representation of the receiver noises normally heard during flight comprising in combination means including a discharge device for generating random low level voltages, a first circuit connected to said device and to the simulated receiver to transmit thereto low lovel voltages representing internally generated noise, an output circuit connected to said device and to the said first circuit and including a filter to attenuate the high frequency voltages, and control circuit means connected to the said output circuit for successively amplifying the filtered random voltages and to intermittently increase the amplification of the said output circuit to simulate a series of static bursts.

8. The invention as set forth in claim 7 including a circuit under the control of an instructor to increase the amplification of the output circuit to simulate static accompanying a lightning discharge.

9. The invention as set forth in claim 7 including a circuit connected to the junction of the first circuit and the output circuit and having an element under the control of a trainee to limit the voltage input to the simulated receiver.

References Cited in the file of this patent

UNITED STATES PATENTS

| 2,415,831 | Marshall | Feb. 18, 1947 |
| 2,521,405 | Phelps | Sept. 5, 1950 |
| 2,715,782 | Cooper | Aug. 23, 1955 |
| 2,730,815 | Gallo | Jan. 17, 1956 |

FOREIGN PATENTS

| 726,878 | Great Britain | Mar. 23, 1955 |